United States Patent [19]
Kioka et al.

[11] Patent Number: 6,111,038
[45] Date of Patent: Aug. 29, 2000

[54] PROCESS FOR PREPARING SOLID TITANIUM CATALYST COMPONENT FOR OLEFIN POLYMERIZATION AND PROCESS FOR PREPARING POLYOLEFIN

[75] Inventors: Mamoru Kioka; Shinichi Kojoh; Tsuneo Yashiki, all of Yamaguchi, Japan

[73] Assignee: Mitsui Chemicals, Tokyo, Japan

[21] Appl. No.: 09/051,288

[22] PCT Filed: Oct. 8, 1996

[86] PCT No.: PCT/JP96/02921

§ 371 Date: Apr. 9, 1998

§ 102(e) Date: Apr. 9, 1998

[87] PCT Pub. No.: WO97/13793

PCT Pub. Date: Apr. 17, 1997

[30] Foreign Application Priority Data

Oct. 11, 1995 [JP] Japan ................................. 7-263235
May 14, 1996 [JP] Japan ................................. 8-119338

[51] Int. Cl.$^7$ ................................. C08F 4/10; C08F 4/16
[52] U.S. Cl. ................................. 526/123.1; 526/124.3; 526/124.6; 526/128; 502/104; 502/232; 502/110; 502/150
[58] Field of Search ................................. 526/118, 125.3, 526/128, 907, 922, 126, 123.1, 113, 124.3, 124.6; 502/113, 127, 133, 134, 170, 104, 110, 232, 150

[56] References Cited

U.S. PATENT DOCUMENTS

4,242,230  12/1980  Ueno et al. .................. 252/425 B
4,861,847  8/1989   Mao et al. .................... 526/125
5,328,877  7/1994   Chadwick et al. ............ 502/127

OTHER PUBLICATIONS

Database WPI, Section Ch, Week 8608, Derwent Publications Ltd., London, GB; & JP 61 004744 A (Nippon Oil KK), Jan. 10, 1986 (English Abstract).

Primary Examiner—David W. Wu
Assistant Examiner—R. Harlan

[57] ABSTRACT

The present invention intends to provide a process for preparation of a solid titanium catalyst component for an olefin polymerization excellent in polymerization activity per unit catalyst, and a process for preparation of a polyolefin using a catalyst containing the catalyst component. The process according to the present invention is characterized by comprising the steps of contacting (A) a magnesium compound with (B) a solution titanium compound to obtain a solid titanium catalyst component composed of titanium, magnesium and a halogen as the essential components, wherein a titanium compound mixture liquid composed of 88 to 99% by weight of a titanium compound and 1 to 12% by weight of hydrocarbon containing halogen-containing hydrocarbon is used as (B) the solution titanium compound.

4 Claims, 2 Drawing Sheets

PROCESS FOR PREPARING SOLID TITANIUM CATALYST COMPONENT FOR OLEFIN POLYMERIZATION AND PROCESS FOR PREPARING POLYOLEFIN

FIELD OF THE INVENTION

The present invention relates to a process for preparing a solid titanium catalyst component to be used as a catalyst component of an olefin polymerization catalyst, and to a process for preparing a polyolefin.

BACKGROUND OF THE INVENTION

The catalyst containing a titanium compound supported on an activated magnesium halide has been known well as a catalyst for preparing an olefin polymer such as a homopolymer of an α-olefin or an ethylene/α-olefin copolymer. As such an olefin polymerization catalyst, there has been known the catalyst comprising an organometallic compound catalyst component and a solid titanium catalyst component composed of magnesium, titanium, a halogen and polycarboxylic acid ester as the essential components.

There have already been proposed many methods for preparing a solid titanium catalyst component composed of magnesium, titanium, a halogen and polycarboxylic acid ester as the essential components, such as a method comprising the steps of contacting a solution of magnesium compound with a solution of titanium compound in the presence of an electron donor to give a solid component, carrying the solid component by polycarboxylic acid ester to give a solid product, and contacting the solid product with a solution of titanium compound to produce a solid titanium catalyst component. Further it has been known that the polymer having high stereoregularity can be prepared at high yield by using such a solid titanium catalyst component in polymerization of an α-olefin of 3 or more carbon atoms.

In such a situation, the present inventors have made an intensive investigation on a solid titanium component more excellent in polymerization activity, and completed the present invention by finding that when a titanium compound mixture liquid which contains a specific amount of hydrocarbon containing halogen-containing hydrocarbon is used as a solution of titanium compound component in preparation of a solid titanium catalyst component according to the process as stated above, the amount of the supported titanium per unit catalyst unexpectedly increases compared with the case of using a 100% purity titanium compound so that a solid titanium catalyst component excellent in activity per unit catalyst can be obtained.

The present invention was made in the light of the prior arts as stated above, and the objects of the invention is to provide a process for preparing a solid titanium catalyst component for olefin polymerization capable of realizing high polymerization activity per unit catalyst, and further to provide a process for preparing a polyolefin using the solid titanium catalyst component obtained by the above process.

SUMMARY OF THE INVENTION

The process for preparing a solid titanium catalyst component for olefin polymerization, according to the present invention, comprises a step of contacting (A) a magnesium compound with (B) a solution of titanium compound to obtain a solid titanium catalyst component composed of titanium, magnesium and a halogen as the essential components. A titanium compound mixture liquid comprising 88 to 99% by weight of a titanium compound and 1 to 12% by weight of hydrocarbon containing halogen-containing hydrocarbon is used as (B) the solution of titanium compound.

The followings are examples of such a process for preparing a solid titanium catalyst component for olefin polymerization:

A process comprising the steps of contacting (A') a solution of magnesium compound with (B) a solution of titanium compound in the presence of (C) an electron donor to give a solid component, and supporting thereon a polycarboxylic acid ester, to obtain a solid titanium catalyst component composed of titanium, magnesium, a halogen and polycarboxylic acid ester as the essential components.

A titanium compound mixture liquid comprising 88 to 99% by weight of a titanium compound and 1 to 12% by weight of hydrocarbon containing halogen-containing hydrocarbon is used as (B) the solution of titanium compound.

A process comprising the steps of contacting (A') a solution of magnesium compound with (B) a solution of titanium compound in the presence of (C) an electron donor to give a solid component, supporting thereon a polycarboxylic acid ester to give a solid product, and contacting the solid product with (B') a solution of titanium compound, to obtain a solid titanium catalyst component composed of titanium, magnesium, a halogen and polycarboxylic acid ester as the essential components, A titanium compound mixture liquid comprising 88 to 99% by weight of a titanium compound and 1 to 12% by weight of hydrocarbon containing halogen-containing hydrocarbon is used as (B) the solution of titanium compound and/or (B') the solution of titanium compound.

According to the process for preparing a solid titanium catalyst component for olefin polymerization of the present invention, a solid titanium catalyst component for olefin polymerization capable of realizing high polymerization activity per unit catalyst can be obtained because the amount of the carried titanium per unit catalyst increases.

The process for preparing a polyolefin according to the present invention employs an olefin polymerization catalyst composed of:

(A) the solid titanium catalyst component obtained according to the above-mentioned process, (B) an organoaluminum catalyst component, and (c) an organosilicon compound catalyst component having Si—O—C linkage.

In accordance with the present invention, polyolefin can be produced in high productivity (per unit catalyst).

BRIEF DESCRIPTION OF THE DRAWING

1: condenser, 2: round flask, 3: ice water, 4: coolant ciruclating pump, 5: Peristor pump, and 6: stirrer

BEST MODE FOR CONDUCTING THE INVENTION

The process for preparing a solid titanium catalyst component for olefin polymerization and the process for preparing a polyolefin of the present invention will be described in detail hereinafter.

According to the present invention, in preparation of a solid titanium catalyst component composed of titanium, magnesium and a halogen as the essential components by contacting (A) a magnesium compound with (B) a solution of titanium compound, a titanium compound mixture liquid composed of 88 to 99% by weight of a titanium compound and 1 to 12% by weight of hydrocarbon containing halogen-containing hydrocarbon is used as (B) the solution of titanium compound.

The titanium compound mixture liquid used in the present invention comprises a titanium compound in an amount of 88–99% by weight, preferably 90–99% by weight, and hydrocarbon containing halogen-containing hydrocarbon in an amount of 1–12% by weight, preferably 1–10% by weight.

As a titanium compound contained in the titanium compound mixture liquid, there can be employed, for example, a tetravalent titanium compound represented by the formula:

$$\text{Ti}(\text{OR})_n\text{X}_{4-n}$$

wherein R represents a hydrocarbon group, X represents a halogen atom, and n satisfies $0 \leq n \leq 4$.

Concrete examples of such a titanium compound include the titanium tetrahalide such as $\text{TiCl}_4$, $\text{TiBr}_4$ and $\text{TiI}_4$; the alkoxytitanium trihalide such as $\text{Ti}(\text{OCH}_3)\text{Cl}_3$, $\text{Ti}(\text{OC}_2\text{H}_5)\text{Cl}_3$, $\text{Ti}(\text{On-C}_4\text{H}_9)\text{Cl}_3$, $\text{Ti}(\text{OC}_2\text{H}_5)\text{Br}_3$ and $\text{Ti}(\text{O-iso-C}_4\text{H}_9)\text{Br}_3$; the dialkoxytitanium dihalide such as $\text{Ti}(\text{OCH}_3)_2\text{Cl}_2$, $\text{Ti}(\text{OC}_2\text{H}_5)_2\text{Cl}_2$, $\text{Ti}(\text{On-C}_4\text{H}_9)_2\text{Cl}_2$ and $\text{Ti}(\text{OC}_2\text{H}_5)_2\text{Br}_2$; the trialkoxytitanium monohalide such as $\text{Ti}(\text{OCH}_3)_3\text{Cl}$, $\text{Ti}(\text{OC}_2\text{H}_5)_3\text{Cl}$, $\text{Ti}(\text{On-C}_4\text{H}_9)_3\text{Cl}$ and $\text{Ti}(\text{OC}_2\text{H}_5)_3\text{Br}$; the tetraalkoxytitanium such as $\text{Ti}(\text{OCH}_3)_4$, $\text{Ti}(\text{OC}_2\text{H}_5)_4$, $\text{Ti}(\text{On-C}_4\text{H}_9)_4$, $\text{Ti}(\text{O-iso-C}_4\text{H}_9)_4$ and $\text{Ti}(\text{O-2-ethylhexyl})_4$.

Among these, preferred is the halogen-containing titanium compound, more preferred is the titanium tetrahalide, and particularly preferred is titanium tetrachloride. The titanium compound mixture liquid may contain these titanium compounds singly or in combination of two or more kinds thereof.

The "hydrocarbon containing halogen-containing hydrocarbon" contained in the titanium compound mixture liquid is a mixture of halogen-containing hydrocarbon and hydrocarbon.

Concrete examples of the halogen-containing hydrocarbon include the halogen-containing aliphatic hydrocarbon such as chloroethane, chloropropane, chlorobutane, chlorohexane, chloroheptane, chlorooctane, chlorononane and chlorodecane; the halogen-containing alicyclic hydrocarbon such as chlorocyclohexane; the halogen-containing aromatic hydrocarbon such as chlorobenzene and chlorotoluene. These halogen-containing hydrocarbons may be contained in the hydrocarbon containing halogen-containing hydrocarbon singly or in combination. It is desired that the halogen-containing hydrocarbon is contained in an amount of 0.01–3.0% by weight in the titanium compound mixture liquid.

Concrete examples of the hydrocarbon include the saturated aliphatic hydrocarbon, the unsaturated aliphatic hydrocarbon and the aromatic hydrocarbon. Among these, preferred is a hydrocarbon having 4–16 carbon atoms, particularly preferred is a saturated hydrocarbon having 4–16 carbon atoms. Examples of such a saturated hydrocarbon having 4–16 carbon atoms include butane, pentane, hexane, heptane, octane, nonane, decane, undecane, dodecane, tridecane, tetradecane, pentadecane and hexadecane. Among these, preferred is a saturated hydrocarbon having 5–14 carbon atoms, preferably 6–12 carbon atoms.

These hydrocarbons may be contained in the saturated hydrocarbon containing halogen-containing hydrocarbon singly or in combination.

As such a titanium compound mixture liquid, there can be employed, for example, a mixture liquid comprising 90–98.6% by weight of a titanium compound, 0.1–0.9% by weight of 2-chlorooctane, 0–0.4% by weight of hexane, 0.7–4.5% by weight of octane, 0.1–0.5% by weight of nonane and 0.5–3.7% by weight of decane.

The above composition of titanium compound mixture liquid may be obtained by blending the titanium compound and the hydrocarbon containing halogen-containing hydrocarbon both as aforesaid, or obtained by distilling a solution containing a titanium compound which can be obtained in the following preparation of a solid titanium catalyst component.

Concrete examples of the magnesium compound (A) employed in the present invention include the magnesium halide such as magnesium chloride, magnesium bromide, magnesium iodide and magnesium fluoride; the alkoxy magnesium halide such as methoxymagnesium chloride, ethoxymagnesium chloride, isopropoxymagnesium chloride, butoxymagnesium chloride and octoxymagnesium chloride; the aryloxymagnesium halide such as phenoxymagnesium chloride and methylphenoxymagnesium chloride; the alkoxymagnesium such as ethoxymagnesium, isopropoxymagnesium, butoxymagnesium, octoxymagnesium and 2-ethylhexoxymagnesium; the aryloxymagnesium such as phenoxymagnesium and dimethylphenoxymagnesium; the magnesium carboxylate such as magnesium laurate and magnesium stearate; and the inorganic acid salt such as magnesium carbonate, magnesium borate and magnesium silicate. The magnesium compound may be a complex compound or a composite compound with other metal, or a mixture with other metallic compound or a mixture of two or more kinds of these compounds. Among these, preferred is the magnesium halide, particularly preferred is magnesium chloride.

In the present invention, the magnesium compound may be used as magnesium compound in a liquid state such as a solution of magnesium compound or a magnesium compound suspension. In the case of using a magnesium compound in a solid state, it is dissolved in a solvent having solubilizing ability for magnesium compound to give a solution of magnesium compound, or suspended in a medium having no solubilizing ability for magnesium compound to give a magnesium compound suspension. In the case of using a magnesium compound in a liquid state, it may be used as a solution of magnesium compound as it is or it is dissolved in a solvent having solubilizing ability for magnesium compound to give a solution of magnesium compound. It is preferred in the present invention that the magnesium compound is used in the form of a magnesium compound solution.

Examples of the solvent having solubilizing ability for magnesium compound include, in addition to titanate, an electron donor (E) such as alcohol, aldehyde, amine, carboxylic acid and metallic acid ester excluding titanate, which may be used singly or in combination with two or more kinds thereof.

Examples of the titanate include the orthotitanate such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate and cyclohexyl orthotitanate; and the polytitanate such as polymethyltitanate, polyethyltitanate, poly-n-propyltitanate, poly-i-propyltitanate, poly-n-butyltitanate, poly-i-butyltitanate, poly-n-amyltitanate, poly-2-ethylhexyltitanate, poly-n-octyltitanate, polyphenyltitanate and polycyclohexyltitanate.

Examples of the alcohol having solubilizing ability for magnesium compound include the aliphatic alcohol such as methanol, ethanol, propanol, butanol, ethylene glycol, methyl carbitol, 2-methylpentanol, 2-ethylbutanol, n-heptanol, n-octanol, 2-ethylhexanol, decanol, dodecanol, tetradecyl alcohol, undecenol, oleyl alcohol and stearyl alcohol; the alicyclic alcohol such as cyclohexanol and methylcyclohexanol; the aromatic alcohol such as benzyl alcohol, methylbenzyl alcohol, isopropylbenzyl alcohol, α-methylbenzyl alcohol and α,α,-dimethylbenzyl alcohol; and the aliphatic alcohol containing an alkoxy group such as n-butyl cellosolve and 1-butoxy-2-propanol.

Examples of the carboxylic acid include the organic carboxylic acid of 7 or more carbon atoms such as caprylic acid, 2-ethylhexanoic acid, undecylenic acid, undecanoic acid, nonylic acid and octanoic acid.

Examples of the aldehyde include the aldehyde of 7 or more carbon atoms such as capric aldehyde, 2-ethylhexylaldehyde, caprylic aldehyde and undecylenic aldehyde.

Examples of the amine include the amine of 6 or more carbon atoms such as heptylamine, octylamine, nonylamine, decylamine, laurylamine, undecylamine and 2-ethylhexylamine.

Examples of the metallic acid ester include the zirconium tetraalkoxide such as zirconium tetramethoxide, zirconium tetraethoxide, zirconium tetrabutoxide and zirconium tetrapropoxide.

These titanate and electron donor (E) may be used together with an inert solvent, and concrete examples of the inert solvent include the aliphatic hydrocarbon such as propane, butane, pentane, hexane, heptane, octane, decane, dodecane and kerosene; the alicyclic hydrocarbon such as cyclopentane, cyclohexane and methyl cyclopentane; the aromatic hydrocarbon such as benzene, toluene and xylene; the halogenated hydrocarbon such as ethylenechloride and chrolbenzene; and a mixture thereof.

In the solution of magnesium compound (A') in which a magnesium compound is dissolved in the aforesaid solvent, the magnesium compound is generally contained in an amount of 0.1–20 mol/liter, preferably 0.5–5 mol/liter to the solvent.

As the medium having no solubilizing ability for magnesium compound, there can be used the hydrocarbon exemplified as the inert solvent, preferably the aromatic hydrocarbon.

In the suspension in which a magnesium compound is suspended in the medium having no solubilizing ability for magnesium compound, the magnesium compound is generally contained in an amount of 0.1–20 mol/liter, preferably 0.5–5 mol/liter to the medium.

In the present invention, a solid titanium catalyst component composed of titanium, magnesium and a halogen as the essential components is prepared by contacting the magnesium with the titanium compound mixture liquid. The magnesium compound is generally used in the form of a solution or as a suspension as previously described.

Concrete examples of the process for preparing a solid titanium catalyst component are as follows.

(1) A process for preparing a solid titanium catalyst component composed of titanium, magnesium and a halogen as the essential components by contacting a solution of magnesium compound with a mixed solution of titanium compound in the presence of an electron donor (C).

(2) A process for preparing a solid titanium catalyst component composed of titanium, magnesium, a halogen and polycarboxylic acid ester as the essential components by contacting a solution of magnesium compound (A') with a mixed solution of titanium compound (B) in the presence of an electron donor (C) to give a solid component, and followed by supporting thereon polycarboxylic acid ester.

(3) A process for preparing a solid titanium catalyst component composed of titanium, magnesium, a halogen and polycarboxylic acid ester as the essential components by additionally contacting the solid titanium catalyst component obtained in the process (2) with a mixed solution of titanium compound.

(4) A process for preparing a solid titanium catalyst component composed of titanium, magnesium and a halogen as the essential components by contacting a mixed solution of titanium compound with a magnesium compound suspension in which $Mg(OR^1)_2$ (wherein $R^1$ represents an alkyl group) is suspended in hydrocarbon. In the case of using a mixed solution of titanium compound which does not contain halogen atom, the titanium compound must be contacted with a halogenating agent in any step.

(5) A process for preparing a solid titanium catalyst component composed of titanium, magnesium and a halogen as the essential components by contacting a solution of organomagnesium compound (e.g. $MgR^2_2$, $MgR^2R^3$; wherein $R^2$ and $R^3$ are each a hydrocarbon group of 1–20 carbon atoms) with a mixed solution of titanium compound. In the case of using a mixed solution of titanium compound which does not contain halogen atom, the non-halogen-containing titanium compound must be contacted with a halogenating agent such as $SiX_4$ or $R^4X$ (wherein X is a halogen and $R^4$ is hydrocarbon) in any step.

(6) A process for preparing a solid titanium catalyst component composed of titanium, magnesium, a halogen and polycarboxylic acid ester as the essential components by carrying out the contact with polycarboxylic acid ester in any step in the process (4) or (5).

(7) A process for preparing a solid titanium catalyst component composed of titanium, magnesium and a halogen as the essential components by carrying out the contact with an organic carrier or an inorganic carrier in any step in any of the processes (4)–(6).

(8) A process for preparing a solid titanium catalyst component composed of titanium, magnesium, halogen and polycarboxylic acid ester as essential components which comprises steps of quenching a suspension containing complex particles of a halogenated magnesium and an alcohol in a molten state in a hydrocarbon in the presence of a surface active agent to obtain a solid component by solidification, and followed by contacting the solid component with a mixed solution of titanium compound and polycarboxylic acid ester to support the titanium compound and polycarboxylic acid ester on the solid component.

The polycarboxylic acid ester supported on the solid titanium catalyst component is preferably phthalate, more preferably phthalic acid diester.

Although each amount of the above-mentioned components used in the preparation of a solid titanium catalyst component cannot be easily defined because it varies depending on the process of preparation, the titanium compound is used in an amount of 0.01–1000 mol, preferably 0.1–200 mol in terms of the titanium compound in the solution based on 1 mol of the magnesium compound, and the polycarboxylic acid ester is used in an amount of 0.01–10 mol, preferably 0.1–5 mol based on 1 mol of the magnesium compound. The electron donor (C) is used in an amount of 0.01–5 mol, preferably 0.05–2 mol based on 1 mol of the magnesium compound.

The solid titanium catalyst component thus obtained contains titanium, magnesium and a halogen as the essential components. In such a solid titanium catalyst component, the atomic ratio of halogen/titanium is about 2–200, preferably about 4–100, and the atomic ratio of magnesium/titanium is about 1–100, preferably about 2–50. In the case of the solid titanium catalyst component containing polycarboxylic acid ester, the molar ratio of polycarboxylic acid ester/titanium is about 0.01–100, preferably about 0.2–10.

In the present invention, the following processes for preparing a solid titanium catalyst component are preferred. Among the followings, the process (2) is preferable from the view of the polymerization activity.

(1) A process for preparing a solid titanium catalyst component composed of titanium, magnesium, a halogen and polycarboxylic acid ester as the essential components by contacting a solution of magnesium compound (A') with a solution of titanium compound (B) in the presence of an electron donor (C) to give a solid component, and followed by supporting thereon a polycarboxylic acid ester.

(2) A process for preparing a solid titanium catalyst component comprising the steps of contacting a solution of magnesium compound (A') with a solution of titanium compound (B) in the presence of an electron donor (C) to give a solid component, supporting thereon a polycarboxylic acid ester to give a solid product, and contacting the solid product with a solution of titanium compound (B') to obtain a solid titanium catalyst component composed of titanium, magnesium, a halogen and polycarboxylic acid ester as the essential components, wherein the titanium compound mixture liquid is used as the solution of titanium compound (B) and/or the solution of titanium compound (B'). It is preferred in this case that the titanium compound mixture liquid is used as both the solution of titanium compound (B) and the solution of titanium compound (B').

The solution titanium compound (B) and the solution titanium compound (B') may each be a titanium compound mixture liquid having the same or different composition. When only one of the solution of titanium compound (B) and the solution of titanium compound (B') is the titanium compound mixture liquid, the other solution of titanium compound is a tetravalent titanium compound, preferably a halogen-containing titanium compound, more preferably a titanium tetrahalide, particularly preferably titanium tetrachloride.

The process for preparing a solid titanium catalyst component for olefin polymerization preferred in the present invention comprises in detail the following stages of:

(I) contacting the solution of magnesium compound (A') with the solution of titanium compound (B) in the presence of the electron donor (C) to produce a solid component, and followed by supporting thereon a polycarboxylic acid ester to produce a solid product; and (II) further contacting the solid product with the solution of titanium compound (B') to produce a solid titanium catalyst component.

The stage (I) for producing the solid product (a solid titanium catalyst component) may be conducted in the presence of a hydrocarbon solvent (D). The stage (II) for producing the solid titanium catalyst component may be conducted in the presence of polycarboxylic acid ester and/or an electron donor (C') and/or a hydrocarbon solvent (D'). The polycarboxylic acid esters used in the stages (I) and (II) may be the same or different, the electron donors (C) and (C') may be the same or different, and the hydrocarbon solvents (D) and (D') may be the same or different.

Examples of the hydrocarbon solvents (D) and (D') include the aliphatic hydrocarbon such as propane, butane, pentane, hexane, heptane, octane, decane, dodecane and kerosene; the alicyclic hydrocarbon such as cyclopentane, cyclohexane and methyl cyclopentane; the aromatic hydrocarbon such as benzene, toluene and xylene; the halogenated hydrocarbon such as ethylenechloride and chrolbenzene, or a mixture thereof. Examples of the electron donors (C) and (C') are to be described below.

As the titanium compound mixture liquid used as the solution titanium compound (B) and/or the solution titanium compound (B'), in addition to the titanium compound mixture liquid as exemplified above, there are employable a purified titanium compound mixture liquid obtained by distilling a solution containing titanium compound which has not been supported on the solid product in the stage (I) and/or a solution containing titanium compound which has not been supported on the solid titanium catalyst component in the stage (II), and a blend obtained by blending the purified titanium compound mixture liquid and a liquid titanium compound so as to have the above composition.

The solution containing titanium compound which has not been supported on the solid product may be the solution produced in preparation of the solid product by contacting the solution of magnesium compound (A') with the titanium compound (a solution of titanium compound) and the electron donor (C), or produced in preparation of the solid product by contacting the solution of magnesium compound (A') with a titanium compound mixture liquid and the electron donor (C). The solution containing titanium compound which has not been supported on the solid titanium catalyst component may be the solution produced in the contact of the solid product with the titanium compound (a solution of titanium compound), or produced in the contact of the solid product with a titanium compound mixture liquid.

The solution containing titanium compound which has not been supported on the solid product or the solid titanium catalyst component is generally a solution comprising about 85% by weight of a titanium compound and a plurality of hydrocarbons, and when such a solution is distilled on the condition that, for example, the bottom temperature is 70° C., the top temperature is 53° C., the top pressure is 47 Torr, and the reflux rate is 480 kg/hour, a titanium compound mixture liquid having the aforesaid composition can be obtained.

In such a process for preparing a solid titanium catalyst component, although each amount of the components (A'), (B), (B') and (C) and polycarboxylic acid ester to be used varies depending on their kinds and the contacting condition, the following can be exemplified.

In the stage (I) for producing a solid product, polycarboxylic acid ester is used in an amount of about 0.01–5 mol, preferably about 0.1–1 mol based on 1 mol of the magnesium compound in the solution of magnesium compound (A'), the solution of titanium compound (B) is used in an amount of 0.1–1000 mol, preferably 1–200 mol in terms of the titanium compound in the component (B) based on 1 mol of the magnesium compound in the solution of magnesium compound (A'). The electron donor (C) is used in an amount of about 0.01–5 mol, preferably about 0.05–2 mol based on 1 mol of the magnesium compound in the solution of magnesium compound (A').

In the stage (II) for producing the solid titanium catalyst component, the solution of titanium compound (B') is used in an amount of 0.1–1000 mol, preferably 1–200 mol in terms of the titanium compound in the component (B') based on 1 mol of the magnesium compound in the solid product.

The temperature in contacting each component as stated above generally ranges from −70° C. to 200° C., preferably from −30° C. to 150° C.

The solid titanium catalyst component thus obtained contains titanium, magnesium, a halogen and polycarboxylic acid ester.

In the solid titanium catalyst component prepared in the stage (I) or (II), the atomic ratio of halogen/titanium is 2–100, preferably 4–90, the molar ratio of polycarboxylic acid ester/titanium is 0.01–100, preferably 0.2–10, and the atomic ratio of magnesium/titanium is 2–100, preferably 4–50.

When a titanium compound mixture liquid composed of 88–99% by weight of a titanium compound and 1–12% by weight of hydrocarbon containing halogen-containing hydrocarbon is used as the solution of titanium compound component in the above-mentioned preparation of a solid titanium catalyst component, the amount of supported titanium per unit catalyst unexpectedly increases compared with the case of using a 100% purity titanium compound so that a solid titanium catalyst component capable of realizing high activity per unit catalyst can be obtained. Further, the titanium component mixture liquid may be obtained by distilling the solution containing titanium compound which has not been supported on the solid product in the step of contacting the solution of magnesium compound with the solution of titanium compound and/or the solution containing titanium compound which has not been supported the solid titanium catalyst component in the step of contacting the solid product with the solution of titanium compound so as to have the aforesaid composition, and consequently the recycle of titanium compound and the cost saving can be realized.

Examples of the electron donors (C) and (C') used in the present invention include the amines such as methylamine, ethylamine, dimethylamine, diethylamine, ethylene diamine, tetramethylene diamine, hexamethylene diamine, tributyl amine and tribenzyl amine; the pyrroles such as pyrrole, methyl pyrrole and dimethyl pyrrole; pyrroline; pyrrolidine; indole; the pyridines such as pyridine, methyl pyridine, ethyl pyridine, propyl pyridine, dimethyl pyridine, ethylmethyl pyridine, trimethyl pyridine, phenyl pyridine, benzyl pyridine and pyridine chloride; the nitrogen-containing cyclic compounds such as the piperidines, the quinolines and the isoquinolines; the oxygen-containing cyclic compounds such as tetrahydrofuran, 1,4-cineole, 1,8-cineole, pyrrolefuran, methylfuran, dimethylfuran, diphenylfuran, benzofuran, cumarone, phthalane, tetrahydropyran, pyran and dihidropyran; the phenols of 6–20 carbon atoms which may have a lower alkyl group such as phenol, cresol, xylenol, ethylphenol, propylphenol, nonylphenol, cumylphenol and naphthol; the ketones of 3–15 carbon atoms such as acetone, methylethyl ketone, methylisobutyl ketone, acetophenone, benzophenone, acetylacetone and benzoquinone; the aldehydes of 2–15 carbon atoms such as acetoaldehyde, propionaldehyde, octylaldehyde, benzaldehyde, tolualdehyde and naphthoaldehyde; the organic esters of 2–30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmaleate, di-n-hexyl cyclohexene carboxylic acid ester, diethyl nadic acid ester, diisopropyl tetrahydrophthalate, diethyl phthalate, diisobutyl phthalate, di-n-butyl phthalate, di-2-n-ethylhexyl phthalate, γ-butylolactone, δ-valerolactone, coumarin, phthalide and ethyl carbonate; the acid halides of 2–15 carbon atoms such as acetyl chloride, benzoyl chloride, toluate chloride, anisate chloride and phthalate chloride; the ether of 2–20 carbon atoms such as methyl ether, ethyl ether, isopropyl ether, butyl ether, amyl ether, anisole and diphenyl ether epoxy-p-menthane; the diether such as 2-isopentyl-2-isopropyl-1, 3-dimethoxypropane, 2,2-di-isobutyl-1,3-dimethoxypropane, 2,2-di-isopropyl-1,3-dimethoxypropane, 2-cyclohexylmetyl-2-isopropyl-1,3-dimethoxypropane, 2,2-di-isopentyl-1,3-dimethoxypropane, 2-isobutyl-2-isopropyl-1,3-dimethoxypropane, 2-cyclohexyl-2-isopropyl-1,3-dimethoxypropane, 2-cyclopentyl-2-isopropyl-1,3-dimethoxypropane, 2,2-dicyclopentyl-1,3-dimethoxypropane, 1,2-bis-methoxymethyl-bicyclo-[2,2,1]-heptane, diphenyldimethoxysilane, isopropyl-t-butyldimethoxysilane, 2,2-di-isobutyl-1,3-dimethoxycyclohexane, 2-isopentyl-2-isopropyl-1,3-dimethoxycyclohexane and 9,9-dimethoxymethylfluorene; the acid amides such as amide acetate, amide benzoate and amide toluate; the nitrile such as acetonitrile, benzonitrile and tolunitrile; the organic phosphorus compound having P—O—C linkage such as trimethyl phosphite and triethyl phosphite; and the anhydride such as acetic anhydride, phthalic anhydride and benzoic anhydride.

The organic silicon compound represented by the formula (i) described below on page 30, line 1 of this application may be used as the electron donors (C) and (C').

These electron donors may be used singly or in combination of two or more kinds thereof.

The polycarboxylic acid ester used in the present invention is represented by the following compounds.

wherein $R^{11}$ represents a substituted or unsubstituted hydrocarbon group, $R^{12}$, $R^{15}$ and $R^{16}$ each represent a hydrocarbon group which is substituted or unsubstituted or hydrogen atom, and $R^{13}$ and $R^{14}$ each represent a hydrocarbon group or which is substituted or unsubstituted or a hydrogen atom, preferably at least either of the two is a substituted or unsubstituted hydrocarbon group. $R^{13}$ and $R^{14}$ may be connected together to form a cyclic structure. When the hydrocarbon groups $R^{11}$–$R^{16}$ are substituted, the substituting groups include the heteroatoms such as N, O and S, and have the groups such as C—O—C, COOR, COOH, OH, $SO_3H$, —C—N—C— and $NH_2$.

Concrete examples of the polycarboxylic acid ester include the aliphatic polycarboxylic acid esters such as diethyl succinate, dibutyl succinate, diethyl methylsuccinate, diisobutyl u-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2- ethylhexyl fumarate, diethyl itaconate and dioctyl citraconate; the alicyclic polycarboxylic acid esters such as diethyl 1,2-cyclohexanecarboxylate, diisobutyl 1,2-cyclohexanecarboxylate, diethyl tetrahydrophthalate and diethyl nadiate; the aromatic polycarboxylic acid esters such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutylphthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and the heterocyclic polycarboxylic acid esters such as 3,4-furandicarboxylate.

Other examples of the polycarboxylic acid ester are the long-chain dicarboxylic acid ester such as diethyl adipate, diisobutyl adipate, diisopropyl sebacate, di-n-butyl sebacate, di-n-octyl secabate and di-2-ethylhexyl sebacate.

The solid titanium compound for olefin polymerization prepared by the process of the present invention may be used as an olefin polymerization catalyst in combination with an organometallic compound catalyst component containing a metal selected from Group I to Group III of the periodic table, and optionally with an electron donor such as an organosilicon compound.

An example of such an olefin polymerization catalyst is an olefin polymerization catalyst comprising:

(a) the solid titanium catalyst component, (b) an organoaluminum compound catalyst component, and (c) an organosilicon compound catalyst component having Si—O—C linkage.

Figure 1:
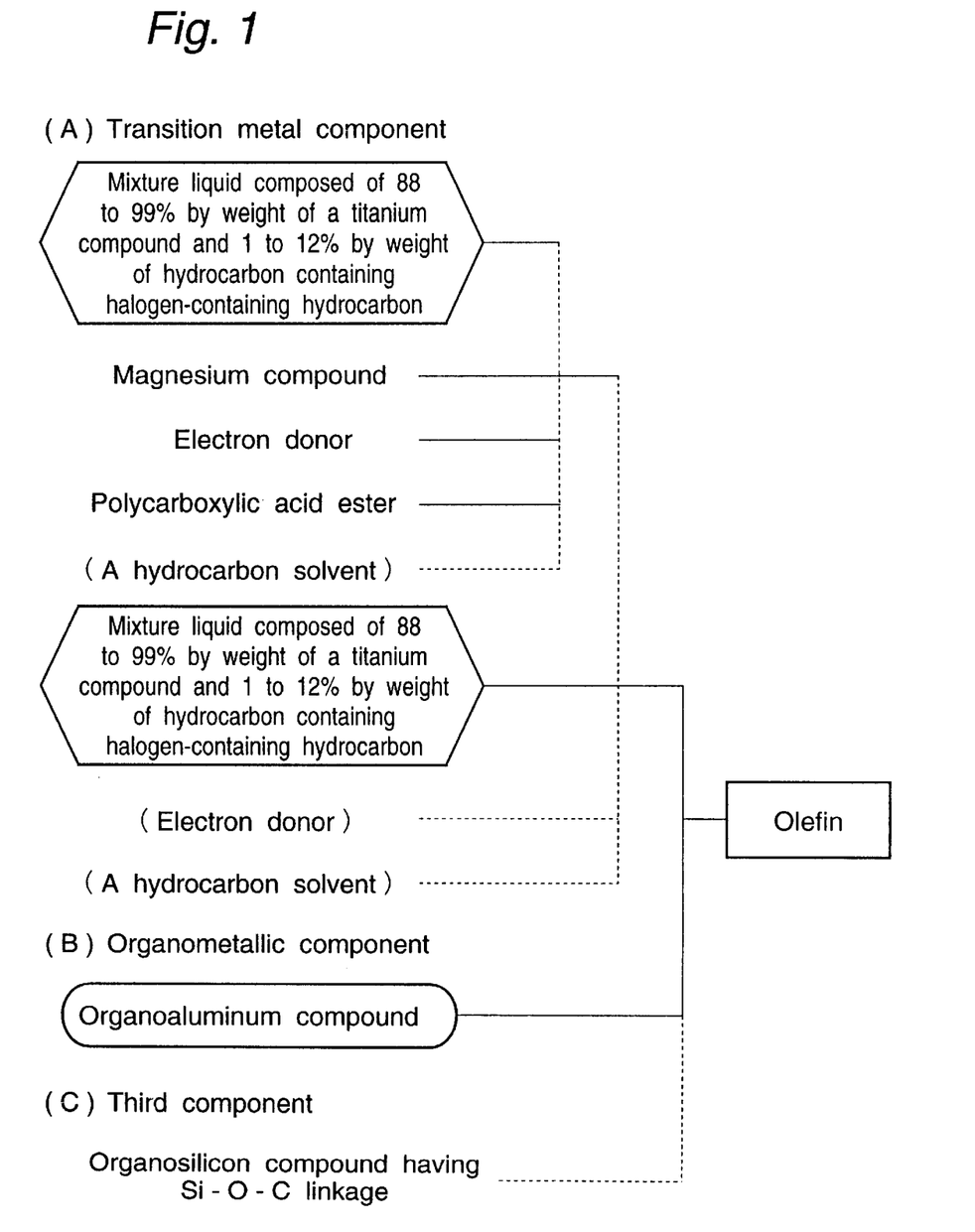
FIG. 1 is a explanatory view showing an example of the process for preparing a solid titanium catalyst component of the present invention.

An example of the process for preparing a solid titanium catalyst component of the present invention is illustrated in FIG. 1.

As the organometallic compound catalyst component, for example, an organoaluminum compound, a complex alkylate of a metal in Group I with aluminum or an organometallic compound of a metal in Group II may be employed.

The organoaluminum compound is, for example, an organoaluminum compound represented by the formula:

$R^a{}_n AlX_{3-n}$ wherein $R^a$ represents a hydrocarbon group of 1–12 carbon atoms, X represents a halogen atom or a hydrogen atom, and n is 1–3.

In the above formula, $R^a$ is a hydrocarbon group of 1–12 carbon atoms such as alkyl, cycloalkyl or aryl, more specifically, methyl, ethyl, n-propyl, isopropyl, isobutyl, pentyl, hexyl, octyl, cyclopentyl, cyclohexyl, phenyl or tolyl.

Concrete examples of the organoaluminium compound include the trialkylaluminum such as trimethylaluminum, triethylaluminum, triisopropylaluminum, triisobutylaluminum, trioctylaluminum, tri(2-ethylhexyl) aluminum and tridecylaluminum; the alkenylaluminum such as isoprenylaluminum; dialkylaluminum halides such as dimethylaluminum chloride, diethylaluminum chloride, diisopropylaluminum chloride, diisobutylaluminum chloride and dimethylaluminum bromide; the alkylaluminum sesquihalide such as methylaluminum sesquichloride, ethylaluminum sesquichloride, isopropylaluminum sesquichloride, butylaluminum sesquichloride and ethylaluminum sesquibromide; the alkylaluminum dihalide such as methylaluminum dichloride, ethylaluminum dichloride, isopropylaluminum dichloride and ethylaluminum dibromide; and the alkylaluminum hydride such as diethylaluminum hydride and diisobutylaluminum hydride.

As the organoaluminum compound, there can be used a compound represented by the formula:

$R^a{}_n AlL_{3-n}$ wherein $R^a$ is the same as defined above, L is a group of —$OR^b$, —$OSiR^c{}_3$, —$OAlR^d{}_2$, —$NR^e{}_2$, —$SiR^f{}_3$ or —$N(R^g)AlR^h{}_2$, n is 1–2, $R^b$, $R^c$, $R^d$ and $R^h$ are respectively a group such as methyl, ethyl, isopropyl, isobutyl, cyclohexyl or phenyl, $R^e$ is a hydrogen atom or a group of methyl, ethyl, isopropyl, phenyl or trimethylsilyl, and $R^f$ and $R^g$ are each a methyl group or an ethyl group.

Among these organoaluminum compounds, preferred is a compound represented by $R^a{}_n Al(OAlR^d{}_2)_{3-n}$ such as $Et_2AlOAlEt_2$ or $(iso-Bu)_2AlOAl(iso-Bu)_2$.

The complex alkylate of a metal in Group I and aluminium is, for example, represented by the formula:

$M^1 AlR^j{}_4$ wherein $M^1$ represents Li, Na or K, $R^j$ represents a hydrocarbon group of 1–15 carbon atoms, and concrete examples of such a compound are $LiAl(C_2H_5)_4$ and $LiAl(C_7H_{15})_4$.

The organometallic compound of a metal in Group II is, for example, represented by the formula: $R^k R^l M^2$ wherein $R^k$ and $R^l$ each represent a hydrocarbon group of 1–15 carbon atoms or a halogen, and they may be the same or different except that both are halogens; and $M^2$ is Mg, Zn or Cd. Concrete examples of such a compound are zinc diethyl, diethyl magnesium, butyl ethyl magnesium, ethyl magnesium chloride and butyl magnesium chloride.

These organometallic compound catalyst components may be used singly or in combination with two or more kinds thereof.

An electron donor (F) may be used, if necessary, in combination with the organometallic compound catalyst component. The electron donor (F) is, for example, an organosilicon compound having Si—O—C linkage.

The organosilicon compound having Si—O—C linkage is, for example, represented by the formula (i):

$R^p{}_n Si(OR^q)_{4-n}$     (i)

wherein $R^p$ and $R^q$ are each a hydrocarbon group, and $0 < n < 4$.

Concrete examples of the organosilicon compound include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethydimethoxysilane, methyl silicate, ethyl silicate, butyl silicate, trimethylphenoxysilane, methyltriallyloxysilane, vinyltris(β-methoxyethoxysilane), vinyltriacetoxysilane, dimethyltetraethoxydisiloxane; cyclopentyltrimethoxysilane, 2-methylcyclopentyltrimethoxysilane, 2,3-dimethylcyclopentyltrimethoxysilane, cyclopentyltriethoxysilane; dicyclopentyldimethoxysilane, bis(2-methylcyclopentyl)dimethoxysilane, bis(2,3-dimethylcyclopentyl)-dimethoxysilane, dicyclopentyldiethoxysilane; tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane and cyclopentyldimethylethoxysilane.

Among these, preferred are ethyltriethoxysilane, n-propyltriethoxylisane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

Examples of the electron donor (F) employable, other than these organosilicon compound, are a nitrogen-containing compound, oxygen-containing compound and a phosphorus-containing compound.

Examples of the nitrogen-containing compound are the 2,6-substituted piperidine, the 2,5-substituted piperidine, the substituted methylenediamine and the substituted imidazolidine.

Examples of the oxygen-containing compound are the 2,6-substituted tetrahydropyran and the 2,5-substituted tetrahydropyran.

Example of the phosphorus-containing compound is the phosphite.

These electron donors (F) may be used singly or in combination with two or more kinds thereof.

The olefin polymerizable with such an olefin polymerization catalyst as stated above is, for example, an α-olefin of 2–20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene or 1-eicosene.

In polymerization, these olefins may be used singly or in combination with two or more kinds thereof. Further as a polymerization monomer, there may be used an aromatic vinyl compound such as styrene or allylbenzene; an alicyclic vinyl compound such as vinylcyclohexane; a cycloolefin such as cyclopentene, cycloheptene, norbornene, 5-methyl-2-norbornene, tetracyclododecene or 2-methyl-1,4,5,8-dimethano-1,2,3,4,4a,5,8,8a-octahydronaphthalene; or a compound having a plurality of unsaturated bonds, for example, a conjugated or non-conjugated diene such as 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, isoprene or butadiene.

The polymerization may be conducted by a liquid phase polymerization such as a solution polymerization or a suspension polymerization, or a gas phase polymerization.

In polymerization, the solid titanium catalyst component (a) is generally used in an amount of about 0.0001–50 mmol, preferably about 0.001–10 mmol in terms of the titanium atom in the solid titanium catalyst component (a) based on 1 liter of polymerization volume. The organoaluminum catalyst component (b) is generally used in an amount of about 1–2000 mol, preferably 2–500 mol in terms of the aluminium atom in the organoaluminum catalyst component (b) based on 1 mol of the titanium atom in the polymerization system. The organosilicon compound (c) is generally used in an amount of about 0.001–50 mol, preferably about 0.01–20 mol based on 1 mol of the aluminium atom in the organoaluminum catalyst component (b).

When hydrogen is used in the polymerization, polyolefin having a large melt flow rate can be obtained so that the molecular weight of the obtained polyolefin can be controlled by the feed of hydrogen.

In the case of a liquid phase polymerization, the reaction is generally proceeded on the condition that the polymerization temperature is about −50 to 200° C., preferably about 20 to 100° C., the polymerization pressure is atmospheric pressure to 100 kg/cm$^2$, preferably 2 to 50 kg/cm$^2$. In the case of a gas phase polymerization, the polymerization temperature is set at about −50 to 200° C., preferably about 20 to 100° C., the polymerization pressure is set at atmospheric pressure to 100 kg/cm$^2$, preferably 2 to 50 kg/cm$^2$.

The polymerization may be conducted batch-wise, semi-continuously or continuously.

EFFECT OF THE INVENTION

According to the process for preparing a solid titanium catalyst compound of the present invention, a titanium compound mixture liquid composed of 88 to 99% by weight of a titanium compound and 1 to 12% by weight of hydrocarbon containing halogen-containing hydrocarbon is used as a solution of titanium compound in preparation of the solid titanium catalyst compound, so that a solid titanium catalyst compound for olefin polymerization capable of realizing high activity per unit catalyst can be obtained.

Further, the titanium compound mixture liquid may be obtained by distilling the solution containing titanium compound which has not been supported on the solid product in the step of contacting the solution of magnesium compound with the solution of titanium compound and/or the solution containing titanium compound which has not been supported on the solid titanium catalyst component in the step of contacting the solid product with the solution of titanium compound so as to have the above-mentioned composition, and consequently the recycle of titanium compound and the cost saving can be realized.

The process for preparing a polyolefin of the present invention employs the olefin polymerization catalyst containing the solid titanium compound catalyst component as stated above, so that olefin polymerization can be conducted at high polymerization activity.

EXAMPLE

The present invention is illustrated below with reference to examples, which should not be construed as limiting the scope of the invention.

Figure 2:
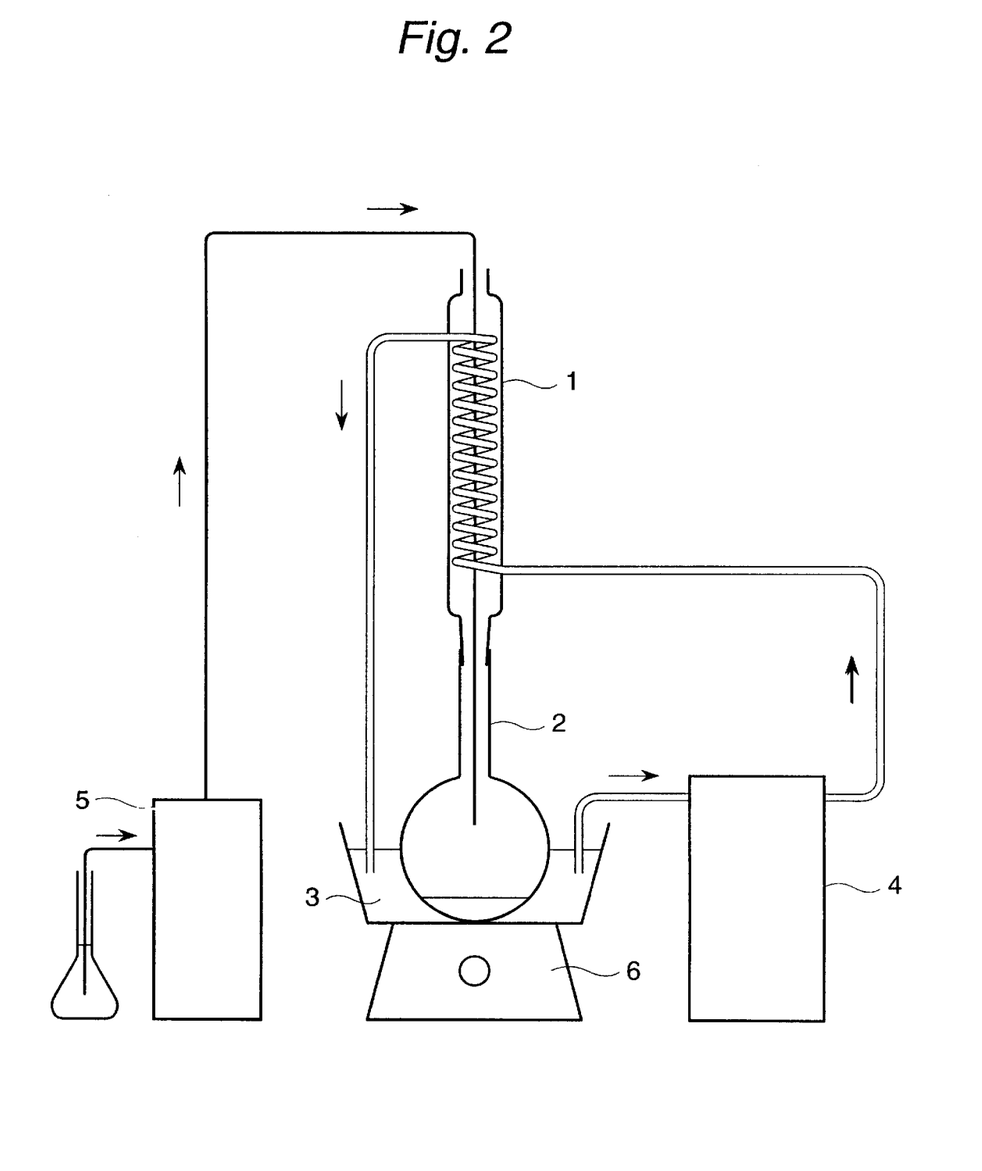
FIG. 2 is a schematic view showing a device for measuring the composition of a titanium tetrachloride mixture liquid.

In the examples, the composition of titanium tetrachloride mixture liquid was determined by measuring the hydrocarbon separated by using a device shown in FIG. 2 by gas chromatography. To calculate the purity of the titanium tetrachloride, the weight of the titanium tetrachloride was found by decreasing the weight of hydrocarbon from the weight of the titanium tetrachloride mixture liquid. FIG. 2 is a schematic view showing a device used for measuring the composition of titanium tetrachloride mixture liquid, wherein 1 represents a condenser, 2 represents a round flask, 3 represents ice water, 4 represents a coolant circulating pump, 5 represents Peristar pump, and 6 represents a stirrer.

(1) To a 200-ml dried round flask, about 20 ml of toluene was charged.
(2) 10 ml of a specimen was pipetted out and charged into the round flask.
(3) As shown in FIG. 2, the flask was joined with a condenser, and cooled by ice water.
(4) A coolant circulating pump was turned on to circulate the ice water inside the condenser.
(5) When the condenser was cooled, Peristar pump was turned on to commence the dropping of a pure water at the rate of 2 ml/min. (SPEED=×15, CONTROL=3–5, POWER=R)
(6) During the dropping of water, a yellowish brown solid was produced. In such a situation, a stirring operation was gently carried out with the joint of the flask and the condenser held by hand. (The stirring operation may be carried out by a stirrer set to the device.)
(7) While the dropping of water was continued, the solid was dissolved to be a clouded liquid. When the cloud of the liquid was disappeared, the reaction was completed.
(8) After the content of the round flask was introduced to a 100-ml separatory funnel A, 10 ml of toluene used for washing the inside of the round flask was also introduced to the separatory funnel A.
(9) The separatory funnel A was shaken and allowed to stand for separation, and then an aqueous phase was introduced to another separatory funnel B and a toluene phase was introduced to a 50-ml measuring flask.
(10) 10 ml of toluene was charged into the separatory funnel A to wash the inside thereof, and then introduced to the separatory funnel B to be shaken.
(11) After the separatory funnel B was allowed to stand for separation, a toluene phase was introduced to the 50-ml measuring flask formerly charged with toluene.
(12) About 0.5 ml of p-xylene was added to the 50-ml measuring flask charged with toluene, and measurement by gas chromatography was conducted under the following conditions.

Conditions for Measurement of Gas Chromatography

Apparatus: SHIMAZU GC-14A
Data Processor: SHIMAZU C-R7A
Column: DB-WAX (0.25 mmø×30 m df=0.5 μm)
    +DB-1701 (0.25 mmø×30 m df=1.0 μm)
Column Temperature: 40° C.–(10° C./min)→220° C. (15 min)
Inlet Temperature: 140° C.
Detector Temperature: 220° C.
Detector: FID (Air 0.6 kg/cm$^2$.H$_2$ 0.6 kg.cm$^2$)
Carrier Gas: He 0.55 ml/min (B·P 1.4 kg/cm$^2$)
Split Flow Rate: 60 ml/min
Split Ratio: 1:110
Septum Flow Rate: 18 ml/min
Amount of Influent: 1.5 μl
Sensitivity of Detector: X10$^2$→10 (16 min)
Parameters in Data Processor:
    WIDTH=3, SLOPE=200, DRIFT=0, MIN.AREA=20, T.DBL=0, STOP.TM=30, ATTEN=0, SPEED=5, METHOD=3,
    FORMAT=200, SPL.WT=10, IS.WT=0.5

Example 1

[Preparation of Solid Titanium Catalyst Component (A-1)]

To a 0.5-m$^3$ reactor were charged 98.5 kg of 2-ethylhexyl alcohol, 78.3 kg of decane and 24 kg of magnesium chloride to give a homogeneous solution at 140° C. Then, 5.6 kg of phthalic anhydride was introduced thereto, and followed by cooling to room temperature to obtain a liquid magnesium compound (m-1).

To a 1-m$^3$ reactor was charged 0.3 m$^3$ of a titanium tetrachloride mixture liquid (1) having the composition shown in Table 1. After lowering the temperature to –20° C., 103.2 kg of the magnesium compound (m-1) was introduced thereto. This titanium tetrachloride mixture liquid (1) was obtained by distilling the hydrocarbon containing the titanium tetrachloride stored in a storage tank (D) which will be described below in comparative Example 2, on the condition that the bottom temperature was 67.5° C., the top temperature was 52.0° C., the top pressure was 50 Torr, and the reflux rate was 500.1 kg/hour.

When the introduction was completed, the temperature of the mixture was raised to 110° C., 8.8 kg of diisobutylphthalate was introduced thereto, and the mixture was kept for 2 hours for reaction. When the reaction was completed, a liquid phase was extracted and stored in the storage tank (D), and a solid phase was transferred to the filter by pressure of nitrogen gas and filtered.

To the solid obtained by the filtration, a small quantity of titanium tetrachloride was added, and the mixture was fed into a 1-m$^3$ reactor by pressure to obtain 0.4 m$^3$ of the titanium tetrachroride mixture liquid (1) having the composition shown in Table 1.

In the above, the filer was kept at 100° C., and the pressure-feeding line which connects the filter with the 1-m$^3$ reactor was kept at 90° C.

The inside temperature of the 1-m$^3$ reactor was raised to 110° C., and kept for 20 minutes. A liquid phase was fed to the filter by pressure in the same manner as described above, and filtered. The solid obtained by the filtration was fed into the 1-m$^3$ reactor by pressure, washed three times with 0.4 m$^3$ of hexane of 60° C., and then washed thoroughly with hexane of room temperature until no titanium was detected in the supernatant liquid.

The thus obtained solid was dried with a paddle dryer to obtain a solid titanium catalyst component (A-1) having the composition shown in Table 2.

[Polymerization]

To a 2-liter autoclave was charged 750 ml of purified n-hexane, and then were charged 0.75 mmol of triethyl aluminium, 0.075 mmol of cyclohexylmethyldimethoxysilane and 0.0075 mmol-/Ti of the solid titanium catalyst component (A-1) in terms of the titanium atom at 40° C. and in a propylene atmosphere.

Further 200 ml of hydrogen was introduced at 60° C. thereto, and the temperature of the system was raised to 70° C. and the system was kept for 2 hours to proceed propylene polymerization. During the polymerization, the pressure was kept at 7 kg/cm$^2$-G.

When the polymerization was completed, the slurry containing a solid product was filtered to separate into white powder and a liquid phase. The white powder was dried under reduced pressure for 10 hours, and then the weight and the properties were measured. A production quantity of polymer soluble in a solvent (n-hexane) was calculated by condensing a part of the liquid phase. The results were shown in Table 3.

Example 2

[Preparation of Solid Titanium Catalyst Component (A-2)]

The solution containing titanium compound (purity of titanium tetrachloride: 85% by weight) obtained in Example 1 and stored in the storage tank (D) was distilled on the condition that the bottom temperature was 68.3° C., the top temperature was 52.6° C., the top pressure was 46 Torr, and the reflux rate was 479.2 kg/hour, to obtain a titanium tetrachloride mixture liquid (2) having the composition shown in Table 1.

A solid titanium catalyst component (A-2) was prepared in the same manner as in Example 1 except that the titanium tetrachloride mixture liquid (1) was replaced by the titanium tetrachloride mixture liquid (2). The composition of the solid titanium catalyst component (A-2) is shown in Table 2.

[Polymerization]

Propylene polymerization was conducted in the same manner as in Example 1 except that the solid titanium catalyst component (A-1) was replaced by the solid titanium catalyst component (A-2). The results are shown in Table 3.

Example 3

[Preparation of Solid Titanium Catalyst Component (A-3)]

The solution containing titanium compound (purity of titanium tetrachloride: 85% by weight) obtained in Example 2 and stored in the storage tank (D) was distilled on the condition that the bottom temperature was 70.2° C., the top temperature was 54.3° C., the top pressure was 52 Torr, and the reflux rate was 449.8 kg/hour, to obtain a titanium tetrachloride mixture liquid (3) having the composition shown in Table 1.

A solid titanium catalyst component (A-3) was prepared in the same manner as in Example 1 except that the titanium tetrachloride mixture liquid (1) was replaced by the titanium tetrachloride mixture liquid (3). The composition of the solid titanium catalyst component (A-3) is shown in Table 2.

[Polymerization]

Propylene polymerization was conducted in the same manner as in Example 1 except that the solid titanium catalyst component (A-1) was replaced by the solid titanium catalyst component (A-3). The results are shown in Table 3.

Example 4

[Preparation of Solid Titanium Catalyst Component (A-4)]

The solution containing titanium compound (purity of titanium tetrachloride: 85% by weight) obtained in Example 3 and stored in the storage tank (D) was distilled on the condition that the bottom temperature was 67.1° C., the top temperature was 49.2° C., the top pressure was 30 Torr, and the reflux rate was 481.7 kg/hour, to obtain a titanium tetrachloride mixture liquid (4) having the composition shown in Table 1.

A solid titanium catalyst component (A-4) was prepared in the same manner as in Example 1 except that the titanium tetrachloride mixture liquid (1) was replaced by the titanium tetrachloride mixture liquid (4). The composition of the solid titanium catalyst component (A-4) is shown in Table 2.

[Polymerization]

Propylene polymerization was conducted in the same manner as in Example 1 except that the solid titanium catalyst component (A-1) was replaced by the solid titanium catalyst component (A-4). The results are shown in Table 3.

Example 5

[Preparation of Solid Titanium Catalyst Component (A-5)]

The solution containing titanium compound (purity of titanium tetrachloride: 85% by weight) obtained in Example 4 and stored in the storage tank (D) was distilled on the condition that the bottom temperature was 69.6° C., the top temperature was 52.8° C., the top pressure was 47 Torr, and the reflux rate was 480.7 kg/hour. The thus obtained distillate was mixed with the solution containing titanium compound stored in the storage tank (D) in equal portions to obtain a titanium tetrachloride mixture liquid (5) having the composition shown in Table 1.

A solid titanium catalyst component (A-5) was prepared in the same manner as in Example 1 except that the titanium tetrachloride mixture liquid (1) was replaced by the titanium tetrachloride mixture liquid (5). The composition of the solid titanium catalyst component (A-5) is shown in Table 2.

[Polymerization]

Propylene polymerization was conducted in the same manner as in Example 1 except that the solid titanium catalyst component (A-1) was replaced by the solid titanium catalyst component (A-5). The results are shown in Table 3.

Comparative Example 1

[Preparation of Solid Titanium Catalyst Component (A-6)]

A solid titanium catalyst component (A-6) was prepared in the same manner as in Example 1 except that the solution containing titanium compound (purity of titanium tetrachloride: 85% by weight) obtained in Example 1 and stored in the storage tank (D) was used without distillation in place of the titanium tetrachloride mixture liquid (1). The composition of the solid titanium catalyst component (A-6) is shown in Table 2.

[Polymerization]

Propylene polymerization was conducted in the same manner as in Example 1 except that the solid titanium catalyst component (A-1) was replaced by the solid titanium catalyst component (A-6). The results are shown in Table 3.

Comparative Example 2

[Preparation of Solid Titanium Catalyst Component (A-7)]

A solid titanium catalyst component (A-7) was prepared in the same manner as in Example 1 except that a 100% purity titanium tetrachloride was used in place of the titanium tetrachloride mixture liquid (1). The composition of the solid titanium catalyst component (A-7) is shown in Table 2.

[Polymerization]

Propylene polymerization was conducted in the same manner as in Example 1 except that the solid titanium catalyst component (A-1) was replaced by the solid titanium catalyst component (A-7). The results are shown in Table 3.

Example 6

[Preparation of Solid Titanium Catalyst Component (A-8)]

A four-neck flask equipped with a stirrer was thoroughly purged with nitrogen, and charged with 4.8 g of magnesium chloride at room temperature (26° C.). 75 ml of toluene was added thereto, and a stirring operation was commenced at a rate of 200 rpm. After the addition of 7.85 ml of chloromethyloxirane, 8.18 ml of tri-n-butylphosphate was also added thereto. Then, the stirring rate was changed to 350 rpm, and the temperature of the mixture was raised to 50° C. After the mixture was kept at 50° C. for 2 hours, 1.18 g of phthalic anhydride was added, and the mixture was kept at 50° C. for another 1 hour to obtain a liquid magnesium compound (m-2).

Subsequently, the obtained liquid was cooled to −23° C., and the titanium tetrachloride mixture liquid (1) used in Example 1 was dropwise added at the same temperature over a period of 1 hour. The temperature of mixture was raised to 80° C. over a period of 4 hours, and 3.35 ml of diisobutylphthalate was added. After the mixture was kept at the same temperature for 1 hour, a solid was collected by filtration. The obtained solid was washed twice with 100 ml of toluene.

The washed solid was suspended in 60 ml of toluene, introduced to the former flask, and 40 ml of the titanium tetrachloride mixture liquid (1) was added thereto. The temperature of the mixture was raised to 90° C., the mixture was kept at 90° C. for 1 hour, and then a solid was collected by filtration, further resuspended in 60 ml of toluene and introduced to the former flask. After the titanium tetrachloride mixture liquid (1) was added thereto, the temperature of the mixture was raised to 90° C., the mixture was kept for 1 hour, and then a solid was collected by filtration. The obtained solid was washed with 100 ml of 1,2-dichloroethane, and further washed four times with 100 ml of hexane to obtain a solid titanium catalyst component (A-8). The composition of the solid titanium catalyst component (A-8) is shown in Table 2.

[Polymerization]

Propylene polymerization was conducted in the same manner as in Example 1 except that the solid titanium catalyst component (A-1) was replaced by the solid titanium catalyst component (A-8). The results are shown in Table 3.

Comparative Example 3

[Preparation of Solid Titanium Catalyst Component (A-9)]

A solid titanium catalyst component (A-9) was prepared in the same manner as in Example 6 except that a 100% purity titanium tetrachloride was used in place of the titanium tetrachloride mixture liquid (1). The composition of the solid titanium catalyst component (A-9) is shown in Table 2.

[Polymerization]

Propylene polymerization was conducted in the same manner as in Example 1 except that the solid titanium catalyst component (A-1) was replaced by the solid titanium catalyst component (A-9). The results are shown in Table 3.

TABLE 1

| | $TiCl_4$ | $C_6$ | $C_8$ | $C_9$ | $C_{10}$ | $C_8$-Cl | $C_8=$ |
|---|---|---|---|---|---|---|---|
| Ex. 1 | 95.4 | 0.2 | 2.2 | 0.2 | 1.6 | 0.4 | 0 |
| Ex. 2 | 96.3 | 0.2 | 1.8 | 0.3 | 1.1 | 0.3 | 0 |
| Ex. 3 | 95.6 | 0.1 | 1.9 | 0.3 | 1.6 | 0.5 | 0 |
| Ex. 4 | 98.6 | 0 | 0.7 | 0.1 | 0.5 | 0.1 | 0 |
| Ex. 5 | 90.0 | 0.4 | 4.5 | 0.5 | 3.7 | 0.9 | 0 |
| Comp. Ex. 2 | 100 | 0 | 0 | 0 | 0 | 0 | 0 |
| Ex. 6 | 95.4 | 0.2 | 2.2 | 0.2 | 1.6 | 0.4 | 0 |
| Comp. Ex. 3 | 100 | 0 | 0 | 0 | 0 | 0 | 0 |

Unit: % by weight
$C_6$: hexane
$C_8$: octane
$C_9$: nonane
$C_{10}$: decane
$C_8$-Cl: 2-chlorooctane
$C_8=$: 2-octene

TABLE 2

| | Ti | Cl | Mg | DIBP | OEH* |
|---|---|---|---|---|---|
| Example 1 | 2.6 | 60 | 18 | 14.5 | 0.0 |
| Example 2 | 2.5 | 61 | 19 | 14.3 | 0.0 |
| Example 3 | 2.6 | 60 | 19 | 14.6 | 0.0 |

TABLE 2-continued

| | Ti | Cl | Mg | DIBP | OEH* |
|---|---|---|---|---|---|
| Example 4 | 2.4 | 61 | 19 | 13.7 | 0.0 |
| Example 5 | 3.1 | 59 | 18 | 16.4 | 0.0 |
| Comp. Ex. 1 | 4.8 | 50 | 17 | 24.5 | 0.0 |
| Comp. Ex. 2 | 1.9 | 63 | 21 | 10.0 | 0.0 |
| Example 6 | 3.1 | 54 | 16 | 22.3 | 0.0 |
| Comp. Ex. 3 | 2.5 | 56 | 17 | 20.1 | 0.0 |

Unit: % by weight
*OEH: 2-ethylhexyl-oxy

TABLE 3

| | Polymerization activity *1 | t-I.I. (%) *2 | MFR (g/10 min) | Bulk density (g/cm³) | Melting point (° C.) |
|---|---|---|---|---|---|
| Example 1 | 12,600 | 98.1 | 5.8 | 0.45 | 161.0 |
| Example 2 | 12,600 | 98.0 | 5.5 | 0.46 | 160.8 |
| Example 3 | 12,500 | 97.9 | 6.3 | 0.45 | 160.7 |
| Example 4 | 12,300 | 98.2 | 6.1 | 0.46 | 160.7 |
| Example 5 | 12,900 | 97.6 | 6.0 | 0.44 | 161.0 |
| Comp. Example 1 | 10,500 | 96.4 | 6.5 | 0.42 | 159.2 |
| Comp. Example 2 | 9,800 | 98.1 | 5.7 | 0.44 | 160.9 |
| Example 6 | 10,400 | 98.1 | 4.5 | 0.45 | 160.8 |
| Comp. Example 3 | 9,300 | 98.1 | 4.1 | 0.44 | 160.9 |

*1: g-PP/g-catalyst $$t-I.I. = \left\{ \frac{\text{Yield of powdery polymer} \times \left( \frac{\text{extraction residue by boiling heptane}}{100} \right)}{\text{Yield of powdery polymer} + \text{amount of solvent soluble polymer}} \right\} \times 100$$

What is claimed is:

1. A process for preparing a solid titanium catalyst component for olefin polymerization comprising a step of contacting (A) a solution of a magnesium compound with (B) a solution of titanium compound, to obtain a solid titanium catalyst component composed of titanium, magnesium and a halogen as the essential components, wherein a titanium compound mixture liquid comprising 88 to 99% by weight of a titanium compound and 1 to 12% by weight of hydrocarbon containing halogen-containing hydrocarbon is used as (B) the solution of titanium compound.

2. A process for preparing a solid titanium catalyst component for olefin polymerization comprising the steps of contacting (A') a solution of magnesium compound with (B) a solution of titanium compound in the presence of (C) an electron donor to produce a solid component, and supporting thereon a polycarboxylic acid ester, to obtain a solid titanium catalyst component composed of titanium, magnesium, a halogen and polycarboxylic acid ester as the essential components;

wherein a titanium compound mixture liquid comprising 88 to 99% by weight of a titanium compound and 1 to 12% by weight of hydrocarbon containing halogen-containing hydrocarbon is used as (B) the solution of titanium compound.

3. A process for preparing a solid titanium catalyst component for olefin polymerization comprising the steps of contacting (A') a solution of magnesium compound with (B) a solution of titanium compound in the presence of (C) an electron donor to produce a solid component, supporting thereon a polycarboxylic acid ester to produce a solid product, and contacting the solid product with (B') a solution of titanium compound, to obtain a solid titanium catalyst component composed of titanium, magnesium, a halogen and polycarboxylic acid ester as the essential components, wherein a titanium compound mixture liquid comprising 88 to 99% by weight of a titanium compound and 1 to 12% by weight of hydrocarbon containing halogen-containing hydrocarbon is used as (B) the solution of titanium compound and/or (B') the solution of titanium compound.

4. A process for preparing a polyolefin which comprises contacting an olefin with an olefin polymerization catalyst comprising:

(a) the solid titanium catalyst component obtained according to the process claimed in any of claims 1 to 3, (b) an organoaluminum catalyst component, and (c) an organosilicon compound catalyst component having Si—O—C linkage.

* * * * *